US008423394B2

(12) United States Patent (10) Patent No.: US 8,423,394 B2
Kogan et al. (45) Date of Patent: Apr. 16, 2013

(54) METHOD FOR TRACKING THE STATUS OF A WORKFLOW USING WEBLOGS

(75) Inventors: Sandra L. Kogan, Newton, MA (US); Eric M. Wilcox, Winchester, MA (US)

(73) Assignee: International Business Machines Corporation, Armonk, NY (US)

(*) Notice: Subject to any disclaimer, the term of this patent is extended or adjusted under 35 U.S.C. 154(b) by 1603 days.

(21) Appl. No.: 10/735,087

(22) Filed: Dec. 12, 2003

(65) Prior Publication Data

US 2005/0131750 A1 Jun. 16, 2005

(51) Int. Cl.
*G06Q 10/00* (2012.01)

(52) U.S. Cl.
USPC .......................................................... 705/7.15

(58) Field of Classification Search .................. 705/7.15
See application file for complete search history.

(56) References Cited

U.S. PATENT DOCUMENTS

| | | | |
|---|---|---|---|
| 5,553,235 A | 9/1996 | Chen et al. | |
| 5,911,143 A * | 6/1999 | Deinhart et al. | 1/1 |
| 5,982,369 A | 11/1999 | Sciammarella et al. | |
| 5,999,911 A | 12/1999 | Berg et al. | |
| 6,088,679 A * | 7/2000 | Barkley | 705/8 |
| 6,202,066 B1 | 3/2001 | Barkley et al. | |
| 6,453,353 B1 | 9/2002 | Win et al. | |
| 6,539,404 B1 * | 3/2003 | Ouchi | 715/205 |
| 6,615,199 B1 | 9/2003 | Bowman-Amuah | |
| 6,651,033 B2 * | 11/2003 | Nemoto et al. | 702/182 |
| 6,823,513 B1 | 11/2004 | McNally et al. | |
| 6,947,989 B2 | 9/2005 | Gullotta et al. | |
| 6,952,678 B2 * | 10/2005 | Williams et al. | 705/320 |
| 6,963,902 B2 * | 11/2005 | Bates et al. | 709/206 |
| 6,968,343 B2 | 11/2005 | Charisius et al. | |
| 7,027,997 B1 | 4/2006 | Robinson et al. | |
| 7,062,449 B1 * | 6/2006 | Clark | 705/9 |
| 7,069,003 B2 * | 6/2006 | Lehikoinen et al. | 455/414.2 |
| 7,308,702 B1 * | 12/2007 | Thomsen et al. | 726/1 |
| 7,546,346 B2 | 6/2009 | Ouchi | |
| 7,548,957 B1 * | 6/2009 | Wichmann et al. | 709/217 |
| 7,581,166 B2 * | 8/2009 | Renger et al. | 715/201 |
| 7,653,692 B2 * | 1/2010 | Creamer et al. | 709/206 |
| 7,747,705 B1 * | 6/2010 | Raja | 709/219 |
| 7,844,492 B2 | 11/2010 | Perkowski et al. | |
| 7,945,861 B1 * | 5/2011 | Karam | 715/751 |

(Continued)

OTHER PUBLICATIONS

Agnew, Marion, Collaboration on the Desktop InformationWeek, Jul. 10, 2000.*

(Continued)

*Primary Examiner* — Scott L Jarrett
(74) *Attorney, Agent, or Firm* — Guerin & Rodriguez, LLP

(57) ABSTRACT

Described is a method for tracking the status of a workflow. Each step of the workflow is performed by one or more members of the workflow and each member has at least one workflow role. A weblog is generated to track an instance of the workflow and members are assigned to the weblog. An entry is posted in the weblog to indicate the performance of a workflow action, such as the completion of a workflow step or the execution of a workflow exception. The entry can be made directly into the weblog or may be in response to an entry made in a personal weblog. A workflow feed can be provided to an aggregator to permit monitoring of the workflow along with other workflows and weblog entries. Additionally, the viewing of weblog entries can be restricted to a predetermined group of users.

14 Claims, 4 Drawing Sheets

U.S. PATENT DOCUMENTS

| | | | |
|---|---|---|---|
| 2002/0010741 | A1 | 1/2002 | Stewart et al. |
| 2002/0049627 | A1 | 4/2002 | Goli et al. |
| 2002/0070953 | A1 | 6/2002 | Barg et al. |
| 2002/0087679 | A1 | 7/2002 | Pulley et al. |
| 2002/0099701 | A1 | 7/2002 | Rippich |
| 2002/0103797 | A1 | 8/2002 | Goel et al. |
| 2002/0152254 | A1 | 10/2002 | Teng |
| 2002/0174087 | A1 | 11/2002 | Hao et al. |
| 2002/0194082 | A1* | 12/2002 | Maruyama ............ 705/26 |
| 2003/0018508 | A1* | 1/2003 | Schwanke ............ 705/9 |
| 2003/0018702 | A1 | 1/2003 | Broughton et al. |
| 2003/0023675 | A1 | 1/2003 | Ouchi et al. |
| 2003/0046134 | A1* | 3/2003 | Frolick et al. ............ 705/8 |
| 2003/0051033 | A1 | 3/2003 | Kusumoto et al. |
| 2003/0061266 | A1 | 3/2003 | Ouchi |
| 2003/0110249 | A1 | 6/2003 | Buus et al. |
| 2003/0135565 | A1 | 7/2003 | Estrada |
| 2003/0144868 | A1 | 7/2003 | MacIntyre et al. |
| 2003/0187719 | A1 | 10/2003 | Brocklebank |
| 2004/0002950 | A1 | 1/2004 | Brennan et al. |
| 2004/0015821 | A1 | 1/2004 | Lu et al. |
| 2004/0019799 | A1* | 1/2004 | Vering et al. ............ 713/200 |
| 2004/0054690 | A1 | 3/2004 | Hillerbrand et al. |
| 2004/0162906 | A1 | 8/2004 | Griffin et al. |
| 2005/0027651 | A1 | 2/2005 | Devault |
| 2005/0033777 | A1 | 2/2005 | Moraes et al. |
| 2005/0114347 | A1 | 5/2005 | Wesinger et al. |
| 2005/0182773 | A1 | 8/2005 | Feinsmith |
| 2005/0246193 | A1 | 11/2005 | Roever et al. |
| 2005/0257158 | A1 | 11/2005 | Lombardo |
| 2005/0289163 | A1 | 12/2005 | Gordon et al. |
| 2006/0004691 | A1 | 1/2006 | Sifry |
| 2006/0122876 | A1 | 6/2006 | Von Schweber et al. |
| 2006/0173985 | A1 | 8/2006 | Moore |
| 2006/0277089 | A1* | 12/2006 | Hubbard et al. ............ 705/9 |
| 2007/0094076 | A1 | 4/2007 | Perkowski et al. |
| 2007/0250478 | A1 | 10/2007 | Copperman |
| 2007/0250492 | A1 | 10/2007 | Angel et al. |

OTHER PUBLICATIONS

White, Martin, CMS implementation—project management EContent, vol. 25, No. 11, Nov. 2002.*
Gilmor, Dan, RSS starting to catch on Computerworld, Jul. 28, 2003, vol. 37, No. 30.*
Arnold, Stephen E., Social Software Searcher, Oct. 2003, vol. 11, No. 9.*
Vu, Uyen, How online diaries change knowledge management Canadian HR Reporter, vol. 16, No. 18, Oct. 20, 2003.*
RSS Definition—Wikipedia.org Wikipedia.org, retreived May 1, 2008.*
Weblog definition Dictionary.com, retreived May 1, 2008.*
Weblog definition Googe.com, retreived May 1, 2008.*
Pyron et al., Using Microsoft Project 2000 Que, Oct. 7, 2000, ISBN: 9780789722539.*
LaPlante, Alice, Taligent electronic bulletin board is a workhorse InfoWorlf, vol. 15, No. 19, May 10, 1993.*
Teamware Flow 3.1 User's Guide TeamWARE Group, Apr. 2000.*
ActionWorkflow Enterprise Series 3.0 Process Builder User's Guide Action Technologies, Inc. 1996.*
Udell, Jon, Internet Groupw for Scientific Collaboration, 2000.*
Udell, Jon, Publishing a project weblog InfoWorld, Mar. 28, 2003.*
McGee, Weblogs and knowledge management, part 2 McGee's Musings, May 27, 2003.*
Diehl, Mike, Mike Diehl's WebLog: Blogging for Project Management Nov. 28, 2003.*
Callaghan, Dennis, IBM Previews Blogging Tool; IBM is throwing more weight behind blogging as an enterprise collaboration application with two upcoming versions of new blogging tools as part of its Workplace collaboration Platform eWeek, Jul. 18, 2005, vol. 22, No. 28.*
Pyron et al., Special Edition: Using Microsoft Project 2000 Que, Oct. 7, 2000, ISBN 9780789722539.*
Web Crossing Inc. Release New Weblog Plug-in Business Wire, Sep. 3, 2003.*
Tari, Zahir et al., A Role Base Access Control for Intranet Security IEEE Internet Computing, 1997.*
Lindahl, Charlie et al., Weblogs: Simplifying Web Publishing Computer, Nov. 2003.*
Stone, Biz, Blogging: Genius Strategies for Instant Web Content New Riders, Sep. 11, 2002, ISBN 0735712999.*
Doctorow, Cory et al., Essential Blogging O'Reilly, Sep. 2002, ISBN 0596003889.*
Landon, Deb et al., Deploying Lotus Sametime on the IBM eserver iSeries Server IBM Redbooks, Jun. 2002.*
Pyron et al., Special Edition: Using Microsoft Project 2000 Que, Oct. 7, 2000.*
Udell, Jon, Telling a Story: The weblog as a project management tool May 24, 2001.*
Web Crossing, Inc. Releases New Weblog Plug-in Business Wire, Sep. 3, 2003.*
Lindhal et al., Weblogs: Simplifying Web Publishing Computer, Nov. 2003.*
Paquet, Sebastien et al., A Topic Sharing Infrastructure for Weblog Networks Second Annual Conference on Communication Networks and Services Research (CNSR'04).*
Saunders, Christopher, Merging IM With Blogging InstantMessagingPlanet, Jul. 3, 2003.*
Pyron et al., Using Microsoft Project 2000 Que, Oct. 7, 2000.*
Security for Microsoft Project Central (Microsoft Project 2000) Microsoft Tech Net, 2000.*
Udell, Telling a Story: The weblog as a project management tool May 24, 2001.*
Doctorow et al., Essential Blogging O'Riely, Sep. 2002.*
Rath, Doug; "Objects Ease Workflow: A Closer Look at Tempest"; http://www.internetwk.com/lead/lead062599a; Jun. 25, 1999; 2 pages.
Windley, Phillip J.; "Blogs for Project Management"; http://www.windley.com/2003/06/04; Jun. 4, 2003; 3 pages.
Author: N/A; "Using Weblogs to Manage IT"; Jun. 3, 2003; 2 pages.
Author: N/A; "Blogs for IT Management—Follow-up"; Jun. 6, 2003; 2 pages.
Author: N/A; "Collaborative Document Management by Interwoven and iManage"; Source: EContent Xtra; 1 page, Feb. 2003.
Non-Final Office Action mailed Apr. 21, 2008 in related U.S. Appl. No. 10/960,877 entitled "Role-Based Views Access to a Workflow Weblog".
Final Office Action mailed Sep. 25, 2008 in related U.S. Appl. No. 10/960,877 entitled "Role-Based Views Access to a Workflow Weblog".
Final Office Action mailed Dec. 30, 2008 in related U.S. Appl. No. 10/960,877 entitled "Role-Based Views Access to a Workflow Weblog".
Non-Final Office Action mailed Jun. 8, 2009 in related U.S. Appl. No. 10/960,877 entitled "Role-Based Views Access to a Workflow Weblog".
Final Office Action mailed Mar. 1, 2010 in related U.S. Appl. No. 10/960,877 entitled "Role-Based Views Access to a Workflow Weblog".
Non-Final Office Action mailed Aug. 3, 2010 in related U.S. Appl. No. 10/960,877 entitled "Role-Based Views Access to a Workflow Weblog".
Final Office Action mailed Jan. 19, 2011 in related U.S. Appl. No. 10/960,877 entitled "Role-Based Views Access to a Workflow Weblog".
Non-Final Office Action mailed Jun. 7, 2011 in related U.S. Appl. No. 10/960,877 entitled "Role-Based Views Access to a Workflow Weblog".
Hao et al., "Visualization of Directed Associations in E-Commerce Transaction Data", Hewlett Packard Research Laboratories, Palo-Alto, CA, 7 pages, Dec. 5, 2000.
blogosphere.us/Feb. 27, 2004, http://www.blogosphere.us, 7 pages.
Non-Final Office Action mailed Jul. 27, 2007 in related U.S. Appl. No. 11/117,233 entitled "Visualization of Attributes of Workflow Weblogs".
Non-Final Office Action mailed Feb. 5, 2008 in related U.S. Appl. No. 11/117,233 entitled "Visualization of Attributes of Workflow Weblogs".

Non-Final Office Action mailed Aug. 20, 2008 in related U.S. Appl. No. 11/117,233 entitled "Visualization of Attributes of Workflow Weblogs".

"Google Blog Search", Google, accessed Aug. 18, 2008, product/service developed circa 2004, 5 pages.

"Technorati", accessed Aug. 18, 2008, Wikipedia, product/service developed circa 2004, 1 page.

Final Office Action mailed Apr. 27, 2009 in related U.S. Appl. No. 11/117,233 entitled "Visualization of Attributes of Workflow Weblogs".

Non-Final Office Action mailed Dec. 15, 2009 in related U.S. Appl. No. 11/117,233 entitled "Visualization of Attributes of Workflow Weblogs".

Non-Final Office Action mailed Jul. 22, 2010 in related U.S. Appl. No. 11/117,233 entitled "Visualization of Attributes of Workflow Weblogs".

Final Office Action mailed Apr. 25, 2011 in related U.S. Appl. No. 11/117,233 entitled "Visualization of Attributes of Workflow Weblogs".

Non-Final Office Action mailed Sep. 29, 2011 in related U.S. Appl. No. 11/117,233 entitled "Visualization of Attributes of Workflow Weblogs".

Bouguettaya et al., "Supporting Dynamic Interactions Among Web-Based Information Sources", vol. 12, issue 5, Sep. 2000, 23 pages.

* cited by examiner

Lew Gould Blog | June 23, 2003 | I am available | Edit My Profile | ? | Logout

DENBY AUTO

Home   Post   Archives   Aggregator

Channels

114

- Business Processes
  - Financing Approval (3)
  - Inventory Tracking (21)
  - Receiving a Car (2)
  - Selling a Car (8)
  - Servicing a Car (7)
  - Exceptions

118

- ▶ Corporate
- ▶ HR
- ▶ News
- ▼ Office Blogs
  - Bob O'Hara (2)
  - Lew Gould
  - Linda Anderson
  - Lisa Weller
  - Lucy James (3)
  - Max Higham
- ▶ Personal Interest
- ▶ Regional Auto Sales Edit Channels | Subscribe | Search

Entries

| Description | Date | Author | Status |
|---|---|---|---|
| → 3285G - Sedan | 06/20 | Paul Chen | awaiting PDI |
| → 3425G - Sedan | 06/20 | Paul Chen | awaiting PDI |
| 3687G - Sedan | 06/20 | Paul Chen | awaiting PDI |
| → 3789H - Coupe | 06/20 | Paul Chen | awaiting PDI |
| → 2466D - Coupe | 06/23 | Lucy James | Complete |
| → 2445A - Coupe | 06/23 | Lucy James | Complete |
| → 4567K - Coupe | 06/23 | Lucy James | Complete |
| → 6335P - Coupe | 06/23 | Lucy James | Complete |
| 25651 - Truck | 06/23 | Lucy James | Complete (exceptions) |
| → 4567K - SUV | 06/23 | Lucy James | Complete |

122

126

Receiving a Car 25651 - Truck

Deadline: 06/24/03 *(completed in time)*
Owner: Lucy James

Started: 06/23/03
Completed: 06/23/03

Participants: Lucy James
              Fred Smith
              Paul Chen

Owner reassigned: no

→ Urgent Parts Locator raised for 25651

Part: Bumper         Contact: Fred Smith
ID#: 12B345-BP3      Status: NOT IN STOCK 6/23/03, 11:18am | UPL Exception Comments posted by Fred Smith, 6/23/03, 12:34pm

*FIG. 4*

METHOD FOR TRACKING THE STATUS OF A WORKFLOW USING WEBLOGS

FIELD OF THE INVENTION

The invention relates generally to a method for monitoring a workflow. In particular, the invention relates to the use of weblogs for tracking workflow status and providing a venue for communication and collaboration among co-workers.

Business processes and workflows are typically managed using multiple forms of communications and organization. For example, e-mail is commonly used to inform individuals associated with a business workflow of the occurrence of important events and required actions. In other instances the communications are verbal. Project management software is used to specify the various steps, or tasks, to be performed and to track the completion of these steps. No common form of workflow management exists that centralizes, stores and tracks all communications for practical oversight of the workflow.

When a problem arises with a workflow, a typical response includes contacting individuals responsible for different tasks to determine details of the problem and to determine what actions are being taken to correct the problem. Individuals responsible for the workflow may review numerous written communications, such as status reports and e-mails, to find relevant information. In some instances the audit process may prove fruitless as there may not be any recorded information that relates to the problem. In other instances it can be difficult to determine who performed a step and when the step was performed.

What is needed is a method for managing workflows that yields improved tracking. The method should enable auditing and accountability. In addition, the method should automatically provide for the recording of the completion of workflow steps and allow for the inclusion of exceptions to the workflow. The present invention satisfies these needs and provides additional advantages.

SUMMARY OF THE INVENTION

In one aspect, the invention features a method for tracking the status of a workflow. A weblog is generated to track an instance of the workflow. The workflow has a plurality of workflow steps each performed by at least one member. Each of the members has at least one workflow role. At least one member is assigned to the weblog. An entry is posted in the weblog to indicate that a workflow action has occurred.

In another aspect, the invention features a computing system for tracking the status of a workflow. The computing system includes a display screen, an input device and a server in communication with the display screen and the input device. The input device can receive a client request to generate a weblog for tracking an instance of the workflow, indicate an assignment of a member to the weblog and post an entry in the weblog to indicate that a workflow action has occurred. The server executes a server application to generate the weblog, to assign the member to the weblog and to post an entry in the weblog indicating that a workflow action has occurred.

In still another aspect, the invention features a computer program product for use with a computer system. The computer program product comprises a computer useable medium having embodied therein program code. The program code includes program code for generating a weblog to track an instance of a workflow, program code for assigning a member to the weblog, and program code for posting an entry in the weblog to indicate that a workflow action has occurred.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

FIG. 3 is an illustration of an exemplary personal weblog for monitoring workflow status and posting weblog entries.

FIG. 4 is an illustration of an exemplary aggregator view for monitoring multiple weblog feeds, including workflow processes.

DETAILED DESCRIPTION

In brief overview the invention relates to a method for tracking the status of a workflow. As used herein, workflow means a defined collection of steps or a process that allows a user to manage and monitor activities, tasks and events related to a project or a specific goal. Workflows are intended to include business processes, activities, collections of tasks, to do lists and the like. The method includes creating a workflow weblog, or "blogflow", to track an instance of a workflow. All members assigned to the weblog have roles, or responsibilities, defined by one or more steps in the workflow. The members contribute together in creating posts to the weblog by their normal participation in the workflow process. A role can be reassigned to a different member if the original member becomes unavailable to perform the related task. More than one role can be assigned to a member, and more than one member can be assigned to any role.

As workflow actions occur, the weblog system automatically posts entries in the weblog. In effect, the workflow weblog acts as a logging mechanism for the workflow where messages and updates are automatically generated and posted. Also, members assigned to roles can manually add postings to the weblog. Each member can maintain a personal weblog (i.e., member weblog) which can be configured to aggregate manual and automatic postings from multiple workflow instances and types. Consequently, members can collect and monitor their involvement within a process. The invention also contemplates the entry of exception postings to the weblog. Exception postings relate to matters that may influence the execution of a workflow but are not defined in the workflow steps. Exception postings can take the form of a trouble ticket, requiring affirmative action before the ticket is "closed." Advantageously, entries in the weblog can be fed to an aggregator along with entries from other weblogs, allowing oversight of multiple workflows and multiple instances of a workflow.

Figure 1:
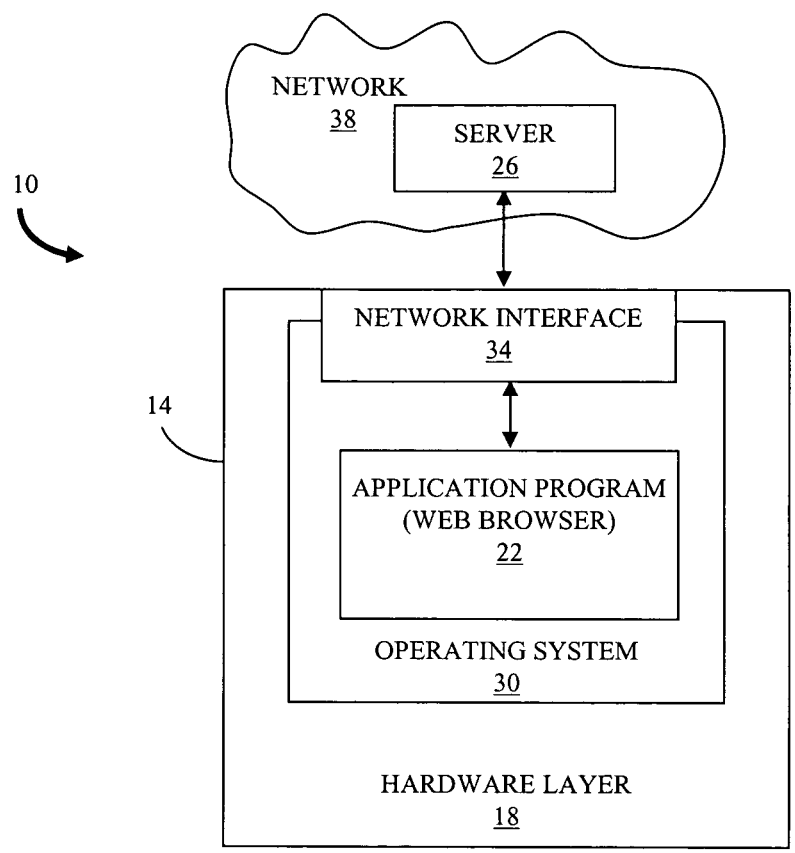
FIG. 1 is a block diagram of an embodiment of a computing system for tracking the status of a workflow according to the invention.

FIG. 1 shows an exemplary computing system 10 in which the method of the invention may be implemented. The computing system 10 includes a client device 14 such as a personal computer, Windows-based terminal, Network Computer, wireless device, workstation, mini-computer, cell phone, personal digital assistant (PDA) or other computing device that has hardware 18 such as a display screen, one or more input devices (e.g., keypad, stylus, keyboard, mouse, touch-pad, and trackball), a processor for executing application programs 22, and sufficient persistent storage for storing such application programs 22 and related information. One type of application program 22 that can be stored is a web browser, such as Internet Explorer™ and Netscape Navigator™, adapted for viewing and interacting with web pages stored on a server 26.

The web browser 22 executes within an operating system 30. Examples of operating systems supported by the client device 14 include Windows 3.x, Windows 95, Windows 98, Windows NT, Windows XP, Windows CE, Macintosh, Java, LINUX, and UNIX. The client device 14 also includes a network interface 34 for communicating over a network 38. The network 38 can be a local-area network (LAN), a metro-area network (MAN), or wide-area network (WAN), such as the Internet or World Wide Web. Users of the client device 14 can connect to the network 38 through one of a variety of connections, such as standard telephone lines, LAN or WAN links (e.g., T1, T3), broadband connections (Frame Relay, ATM), and wireless connections (e.g., 802.11(a), 802.11(b), 802.11(g)). The web browser 22 communicates with the server 26 located on the network 38 through the network interface 34, to download or extract content from web pages stored on the server 26 and to post entries into web pages stored on the server 26.

Figure 2:
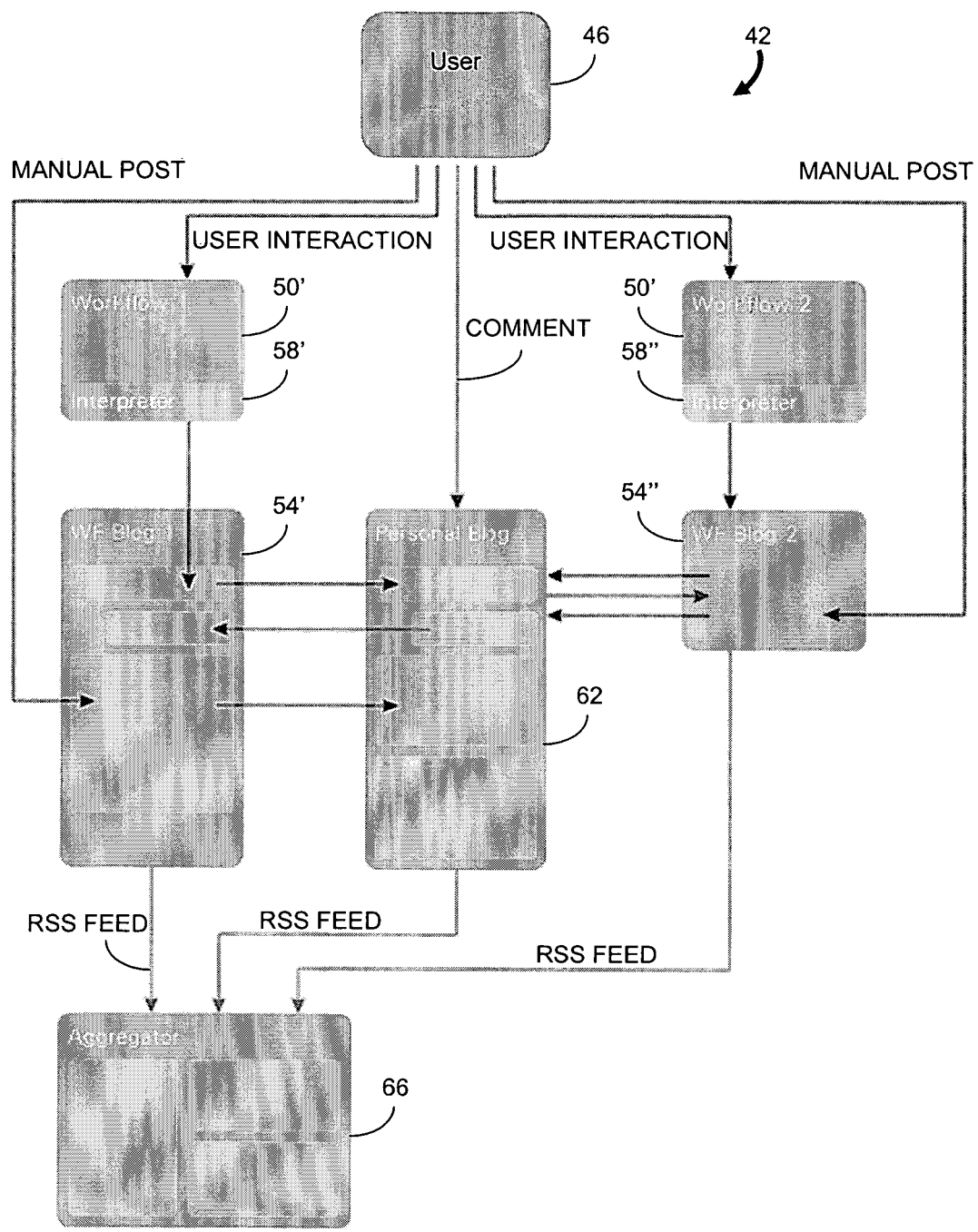
FIG. 2 is a block diagram of an embodiment of a system for tracking the status of multiple workflows according to the invention.

Referring to the functional block diagram shown in FIG. 2, an embodiment of a system 42 for tracking the status of a workflow according to the invention includes a user 46 interacting with two workflow instances 50' and 50" (generally 50). The two workflow instances 50 can be based on the same workflow template. Alternatively, each workflow instance 50 can correspond to a different workflow template. In another option, at least one of the workflow steps is defined upon instantiation of a respective workflow weblog 54' or 54" (generally 54). The workflow steps can be redefined as the particular workflow instance 50 is performed. In addition, one or both of the workflow instances 50 can be part of a greater workflow or can be the parent of one or more subsidiary workflows.

Each workflow weblog 54 can include a blogroll, i.e., a collection of links, or references, that point to other workflow weblogs or other syndicated feeds, such as personal weblogs, company news feeds and the like. The blogroll can include manual entries made by the user 46 and automatic entries made during execution of the respective workflow 50. The entries can link to parent workflows or subsidiary workflows. The state of the linked workflow instance 50 can be presented in the blogroll and is updated through the use of trackbacks. Trackbacks are based on a short message reply, or ping, received from the linked workflow to update the state information.

Each workflow instance 50 communicates with the respective weblog 54 through an interpreter 58. The weblogs 54 can be included within other weblogs or refer to other weblogs. Although only two workflow instances 50, two weblogs 54 and two interpreters 58 are shown, the invention contemplates any number of these components. As illustrated, the user 46 can post directly to a personal weblog 62 (i.e., member weblog). Each workflow weblog 54 is configured for communication with the personal weblog 62 and an aggregator 66. The personal weblog 62 can also communicate with the aggregator 66.

When the user 46 interacts with one of the workflows instances 50, a logging entry is generated. The logging entry is processed by the interpreter 58 and is forwarded for inclusion in the corresponding workflow weblog 54. Processing by the interpreter 58 includes translating raw events triggered in the workflow instance 50 into an XML weblog entry format or other standard weblog entry format that is human readable. The entry is then copied to or referenced in the user's personal weblog 62. Entries in the personal weblog 62 generated by different workflow weblogs 50 can be distinguished by color or content for easy recognition. Similarly, manually generated postings and automatically generated messages can be displayed in different colors or contain signifying marks such as graphical icons. Moreover, entries made according to a specific role can share the same color so the user 46 can easily recognize the contributor.

In response to a workflow generated entry, the user 46 can manually post an entry (e.g., comment) in the workflow weblog 54. Alternatively, the user 46 can comment by posting an entry in their personal weblog 62. Depending on the functionality implemented in the personal weblog 62, an entry is not necessarily linked to or copied to the corresponding workflow weblog 54. Some companies and organizations may wish to limit the posting of entries to automatic posting. Furthermore, companies and organizations may prohibit members from maintaining personal weblogs 62.

Individuals outside the scope of the workflow instance 50 may be able to manually post entries in the workflow weblog 54 if they have access rights. For example, a director or manager may not fulfill a role in the workflow instance 50 but may still be able to post if the director or manager supervises any of the members in the workflow instance 50. In addition, anyone aggregating the workflow weblog 54 has rights and, therefore, can manually post a comment.

Each of the weblogs 54, 62 can be configured to produce RSS (Rich Site Summary or RDF Site Summary) feeds. The RSS feeds are subscribed to by the aggregator 66. Thus the aggregator 66 can receive notifications and updates from a number of workflow instances 50. The aggregator 66 organizes the information provided in the RSS feeds according to workflow types, roles, workflow members, or other parameter included in the RSS feeds. In addition, the aggregator 66 polls the RSS feeds to determine newly added items for presentation to an aggregator user. In one example, an aggregator 66 is used to copy the first few text lines of an entry. In another example, the aggregator 66 acts as a miniature web-browser and copying does not occur. Instead, the entries are viewed directly from downloaded web pages.

The use of a workflow weblog 54 to track the status of an instance of a workflow has many advantages. A major benefit is the ability for collaboration by participants in a business process. Auditing is more easily accomplished in comparison to typical record searching and employee discussions for determining status. Accountability is improved as employees assigned to specific roles must "check off" completion of workflow steps. Entries can thus be traced to the responsible members. For roles that change over time, entries are created as shifts in users occur. This enhances auditing and accounting capabilities. In addition, the workflow weblog 54 organizes information according to when the step to be completed occurs in the overall workflow so an auditor knows where to look for relevant entries. Importantly, the volume of e-mail between individuals that relates to the workflow is reduced and relevant workflow information is centralized.

There is no special expertise required to generate the weblog and to make entries as software for these functions is readily available. Thus the need for special skills and training to use a collaborative tool is eliminated. There are no restrictions to the visual format of entries posted to the weblog 54. The weblog 54 can be accessed using any system or device that has a web browser capability. For example, an employee away from the office can view entries on various portable devices (e.g., personal digital assistants (PDAs) and cell phones). In one embodiment, access to the weblog 54 is limited to users defined in the workflow 50, such as users having specific roles and specified management personnel. Users can post entries to the weblog 54 using PDAs, cell phones, web pages, e-mail programs, instant messaging programs, and custom applications. Entries that can be posted include text, links, and other content. A wide range of options are available for making entries, including HTML forms, e-mail, chat programs, and custom interfaces. Weblog software processes the entries for posting and RSS aggregation, thus the user 14 is relieved of many of the tasks and effort previously required for publication.

The following description is an illustrative example for tracking the status of a workflow is based on an automobile dealership. The dealership receives new cars from an affiliated supplier. The dealership maintains a workflow detailing steps to be performed for each car delivered by the supplier. Once the dealership receives confirmation of a new delivery, the general manager of the dealership initiates the workflow to process the delivery. The workflow includes various steps or actions to be performed such as financing approval, inventory tracking, receiving the car, selling the car, servicing the car, and a means to handle exceptions or actions not described within the workflow.

Various employees at the dealership are assigned as members with specific roles in the workflow. For example, when the general manager launches the workflow, the lot manager is notified of the delivery, for example, on a PDA. The lot manager matches the vehicle identification number and assigns a stock number to the new car using the PDA. The service manager is alerted when the lot manager has completed his tasks. The general manager can examine the workflow at any time to determine its status. The dealership's supplier may have access to the workflow weblog and related workflow weblogs through an RSS aggregator in order to monitor matters for which the supplier may be responsible.

As previously described, exceptions can arise that are not routinely handled by the workflow. In the automobile dealership example, an exception is a damage report indicating that damage has been detected on a received car. Generating a damage report includes initiating an exception workflow weblog that is referenced by or linked to the main weblog for the process. The main weblog may require a trackback message, or ping, before continuing with subsequent steps in the workflow. The trackback allows later entries responsive to the damage report to go to the proper place in the weblog. Without the trackback feature, an auditor may have to view numerous entries made after the damage report to determine whether the damage report was completed. Once the exception workflow weblog is completed, the main weblog resumes its steps. For example, once the damage report is completed, the service manager is alerted and allowed to proceed with a pre-delivery inspection of the car.

Figure 3:
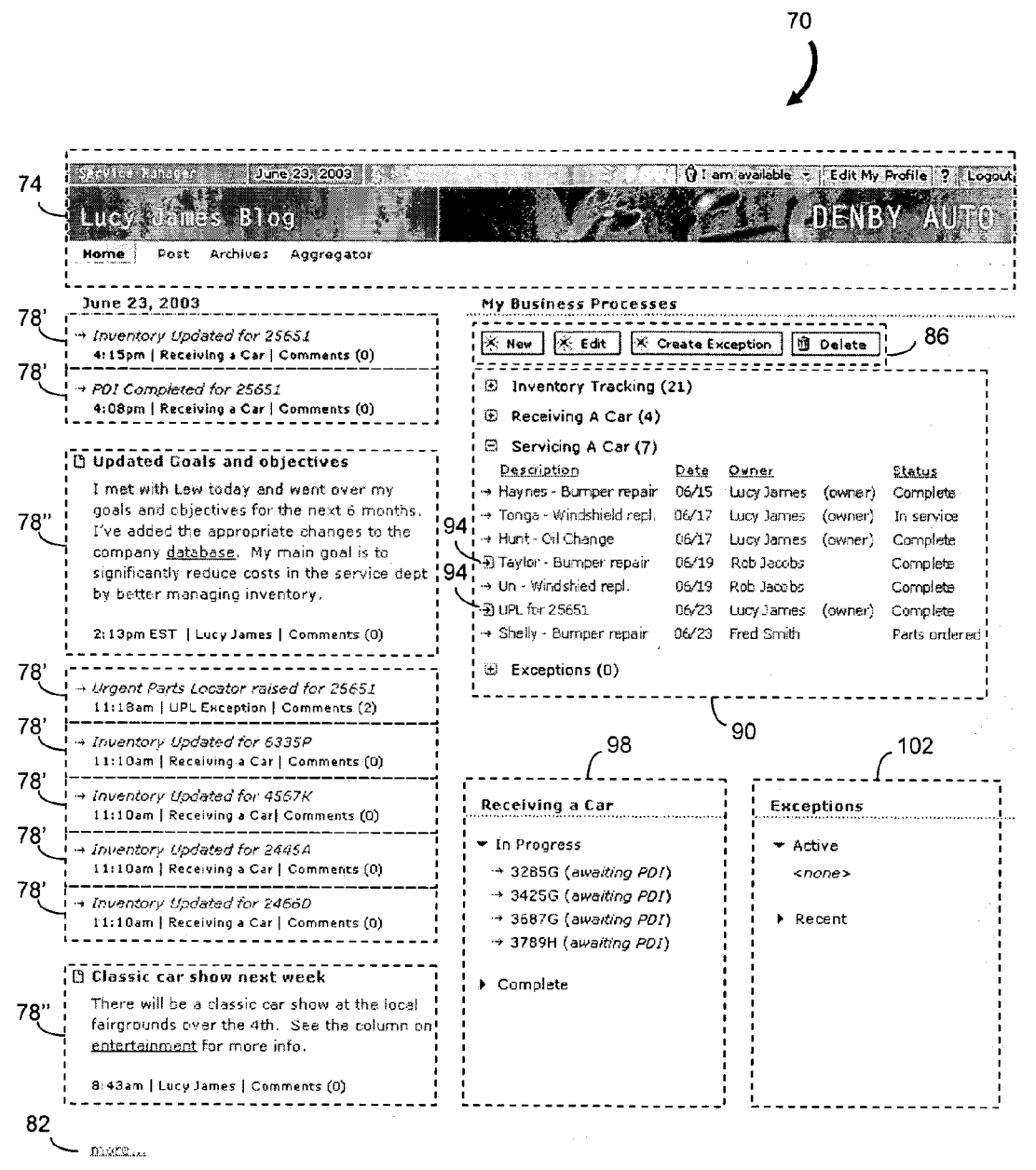

FIG. 3 depicts a personal weblog 70 belonging to a member of multiple workflows. The weblog 70 includes a header 74 that identifies the member (Lucy James), the member's role (service manager) and the organization (Denby Auto). The header 74 also provides the member the ability to create a manual post, to display archived entries and to display aggregator feeds. The left side of the weblog 70 displays automatic entries 78' and manual entries 78" (generally 78) to the weblog 70 in chronological order with the most recent entry being closest to the top of the weblog 70. To see additional entries 78, the member selects "more" 82 at the bottom left portion of the weblog 70.

Each entry 78 shows the posting time, the source or author, and the number of posted comments relating to the entry 78. Workflow entries 78 show the workflow step, time of completion and the workflow name. Because the member is a service manager at an automobile dealership, automatic entries 78' in the weblog 70 typically relate to her tasks at the dealership, such as inventory updates and pre-delivery inspections (PDIs). Entries 78" manually posted by the member can also relate also relate to dealership matters, or may be personal in nature and not available for viewing by others in other weblogs.

At the top right portion of the weblog 70 below the header 74 is a set of selection buttons 86 that allow the member to add a new business process (or workflow), edit an existing business process or delete an existing business process. All members of the process will be able to see these new postings, and edits. The member can also create an exception posting, such as a trouble ticket, for matters that are not defined in a business process. Pending business processes 90 are displayed according to groups. There are 21 inventory tracking processes, four processes relating to receipt of new cars and seven processes relating to servicing cars. As illustrated, the view of the pending business processes 90 includes an expanded view of the car servicing processes. Each car servicing process shows the start date, the person that initiated the process, a brief description and the current status of the process. The word "owner" indicates that the member is the person that initiated the car servicing process. Two business processes 94 are displayed with an additional symbol to indicate that there is at least one related comment entry. At the bottom right portion of the weblog 70 are expanded views 98 and 102 of two business process groups. These expanded views 98, 102 are established by the member for automatic display regardless of content. Typically the automatic expanded views 98, 102 relate to the more critical business processes that are of special interest to the member.

FIG. 4 depicts an aggregator view 106 of a member (Lew Gould) who is general manager of the automobile dealership. The general manager may not be a direct member of many, or perhaps even all, of the workflows identified in the aggregator view 106, however, the general manager still has access based on assigned privileges. The aggregator view 106 includes a header 110 showing that the member has elected to display the aggregator view 106. The left side of the aggregator view 106 includes an expanded view 114 of business processes being monitored by the general manager, with the number in parentheses indicating the number of unread entries for the respective process group. The view 118 below lists other channel groups (i.e., groupings of feeds) of interest to the general manager, including dealership feeds, personal (office) weblog feeds, and personal interest feeds derived from sources unrelated to the dealership. Optionally, the general manager can select (i.e., click on) a channel group to obtain all the entries even though there may be subcategories within the channel group. For example, if the general manager clicks on the bold text "Business Processes", all 41 business processes are displayed.

In the right portion of the aggregator view 106 is an expanded view 122 of workflows related to receiving a car. The two unread entries are referenced by bold text. Just below is an expanded view 126 of the highlighted entry above. The expanded view 126 does not display all the information for the highlighted process but instead shows a summary of the process that includes the most recent entries.

While the invention has been shown and described with reference to specific embodiments, it should be understood by those skilled in the art that various changes in form and detail may be made therein without departing from the spirit and scope of the invention.

What is claimed is:

1. A method for tracking the status of a workflow, the method comprising:

instantiating an instance of a workflow on a computing device by a workflow user, the workflow user being assigned to a role in the workflow, the workflow having a plurality of workflow steps and based on a selected workflow template;

automatically generating a weblog in response to instantiating the instance of the workflow on the computing device to tracking the instance of the workflow, the weblog accessible to weblog members, wherein the weblog members include members who are workflow users and members who do not have a role in the instance of the workflow, first weblog members with permission to view workflow status and weblog comments, and second weblog members with permission to view workflow status and view and post weblog comments, wherein the instance of the workflow includes one or more of a parent to a subsidiary workflow and a child of the parent workflow;

configuring at the computing device the weblog for a weblog member who does not have a role in the instance of the workflow to have permission to manually post an entry in the weblog, the weblog displaying a combination of manual and automatic entries, the automatic entries being computer-generated and directly posted in response to being computer-generated during an execution of the instance of the workflow, the automatic entries relating to tasks of the workflow user, the manual entries posted by one or more of the weblog members who does not have a role in the instance of the workflow, a first weblog member of the first weblog members, a second weblog member of the second weblog members, the manual entries relating to the workflow or relating to non-workflow matters, the method further comprising:

linking one or more of the manual and automatic entries to the one or more of the parent to the subsidiary workflow and the child of the parent workflow; and generating a trackback that updates a state of the instance of the workflow in response to linking the one or more of the manual and automatic entries to the one or more of the parent to the subsidiary workflow and the child of the parent workflow;

causing communication between the workflow and the weblog to post an entry of the combination of manual and automatic entries in the weblog indicating that a workflow action has occurred, the entry being physically viewable on a display device by weblog members;

generating a logging entry at the computing device in response to posting the entry of the combination of manual and automatic entries in the weblog;

processing, by an interpreter, the logging entry;

forwarding the logging entry to the weblog, based on the processing; and presenting weblog entries related to the workflow user's tasks and further related to other workflow instances to an aggregator in communication with the display device, which displays an output of the aggregator to a member of the weblog members, the aggregator arranging the presented weblog entries corresponding to the instance of the workflow at the display device with other workflow instances being monitored by the aggregator as feeds of interest, the output including the weblog entries and an expanded view of at least one of the instance of the workflow and the other workflow instances, the weblog entries provided from the combination of manual and automatic entries, the aggregator further polling the feeds of interest to determine newly added items for presentation to the aggregator user.

2. The method of claim 1 wherein the workflow action comprises the completion of a workflow step.

3. The method of claim 1 wherein the workflow action comprises the execution of a workflow exception.

4. The method of claim 1 further comprising posting an entry in a personal weblog to indicate that the workflow action has occurred.

5. The method of claim 1 further comprising providing a feed to an aggregator, the aggregator receiving entries from the weblog and at least one other instance of a weblog.

6. The method of claim 5 wherein providing a feed comprises providing Rich Site Summary or RDF Summary (RSS) feed from a plurality of weblogs for a syndication.

7. The method of claim 1 wherein the posting of an entry in the workflow weblog is made in response to a posting of an entry in a personal weblog.

8. A computing system for tracking the status of a workflow, the computing system comprising:

a display screen;

an input device to perform:

receiving a client request to instantiate an instance of a workflow by a workflow user, the workflow user being assigned to a role in the workflow, the workflow having a plurality of workflow steps;

receiving a client request to generate a weblog for tracking the instance of the workflow, and a server in communication with the display screen and the input device, the server executing a server application to automatically generate the weblog in response to instantiating the instance of the workflow, the weblog accessible to weblog members, wherein the weblog members include members who are workflow users and members who do not have a role in the instance of the workflow, a weblog member who does not have a role in the instance of the workflow having permission to post an entry in the weblog, first weblog members with permission to view workflow status and weblog comments, and second weblog members with permission to view workflow status and view and post weblog comments, wherein the instance of the workflow includes one or more of a parent to a subsidiary workflow and a child of the parent workflow, the server employing an application to cause communication between the workflow and the weblog to automatically post an entry in the weblog to indicate that a workflow action has occurred, the entry being physically viewable on a display device by the weblog members, the weblog displaying a combination of manual and automatic entries, the automatic entries being computer-generated and directly posted in response to being computer-generated during an execution of the instance of the workflow, the automatic entries relating to tasks of the workflow user, the manual entries posted by one or more of the weblog members who does not have a role in the instance of the workflow, a first weblog member of the first weblog members, a second weblog member of the second weblog members, the manual entries relating to the workflow or relating to non-workflow matters, the server further linking one or more of the manual and automatic entries to the one or more of the parent to the subsidiary workflow and the child of the parent workflow, the server further generating a trackback that updates a state of the instance of the workflow in response to linking the one or more of the manual and automatic entries to the one or more of the parent to the subsidiary workflow and the child of the parent workflow, the server further causing communication between the workflow and the weblog to post an entry of the combination of manual and automatic entries in the weblog indicating that a workflow action has occurred, the entry being physically viewable on a display device by weblog members, the server further generating a logging entry at the computing device in response to posting the entry of the combination of manual and automatic entries in the weblog, the server include an interpreter that processes the logging entry, the server forwarding the logging entry to the weblog based on the processing, the server including an aggregator in communication with the display screen, and presenting weblog entries related to the workflow user's tasks and further related to other workflow instances to the aggregator, the display screen displaying an output of the aggregator to a member of the weblog members, the aggregator arranging the presented weblog entries corresponding to the instance of the workflow at the display device with other workflow instances being monitored by the aggregator as feeds of interest , the output including the weblog entries and an expanded view of at least one of the instance of the workflow and the other workflow instances, the weblog entries provided from the combination of manual and automatic entries, the aggregator further polling the feeds of interest to determine newly added items for presentation to the aggregator user.

9. The computing system of claim 8 further comprising a remote server in communication with the server, the additional server storing a personal weblog and executing a server application to modify the personal weblog.

10. The computing system of claim 8 wherein the server generates a first instance of a weblog and further comprising a remote server in communication with the server, the remote server executing an aggregator application to receive at least one entry from the first instance of a weblog and a second instance of a weblog.

11. A computer program product for use with a computer system, the computer program product comprising a non-transitory computer readable medium having embodied therein a computer program for storing data comprising:
program code for instantiating an instance of a workflow by a workflow user, the workflow user being assigned to a role in the workflow, the workflow having a plurality of workflow steps;
program code for automatically generating a weblog in response to instantiating the instance of the workflow to track the instance of the workflow, the weblog accessible to weblog members, wherein the weblog members include members who are workflow users and members who do not have a role in the instance of the workflow, first weblog members with permission to view workflow status weblog comments, and second weblog members with permission to view workflow status and view and post weblog comments, wherein the instance of the workflow includes one or more of a parent to a subsidiary workflow and a child of the parent workflow;
program code for configuring the weblog for a weblog member who does not have a role in the instance of the workflow to have permission to manually post an entry to the weblog, the weblog displaying a combination of manual and automatic entries, the automatic entries being computer-generated and directly posted in response to being computer-generated during an execution of the instance of the workflow, the automatic entries relating to tasks of the workflow user, the manual entries posted by one or more of the weblog members who does not have a role in the instance of the workflow, a first weblog member of the first weblog members, a second weblog member of the second weblog members, the manual entries relating to the workflow or relating to non-workflow matters, the method further comprising:
linking one or more of the manual and automatic entries to the one or more of the parent to the subsidiary workflow and the child of the parent workflow; and
generating a trackback that updates a state of the instance of the workflow in response to linking the one or more of the manual and automatic entries to the one or more of the parent to the subsidiary workflow and the child of the parent workflow; and
program code for causing communication between the workflow and the weblog to post an entry of the combination of manual and automatic entries in the weblog indicating that a workflow action has occurred, the entry being physically viewable on a display device by the weblog members,
generating a logging entry at the computing device in response to posting the entry of the combination of manual and automatic entries in the weblog;
processing, by an interpreter, the logging entry;
forwarding the logging entry to the weblog, based on the processing; and
presenting weblog entries related to the workflow user's tasks and further related to other workflow instances to an aggregator in communication with the display device, which displays an output of the aggregator to a member of the weblog members, the aggregator arranging the presented weblog entries corresponding to the instance of the workflow at the display device with other workflow instances being monitored by the aggregator as feeds of interest, the output including the weblog entries and an expanded view of at least one of the instance of the workflow and the other workflow instances, the weblog entries provided from the combination of manual and automatic entries, the aggregator further polling the feeds of interest to determine newly added items for presentation to the aggregator user.

12. The computer program product of claim 11 further comprising program code for posting an entry in a personal weblog to indicate that the workflow action has occurred.

13. The computer program product of claim 11 further comprising program code for providing a feed to an aggregator.

14. The computer program product of claim 11 wherein the program code for posting an entry in the weblog is responsive to a posting of an entry in a personal weblog.

* * * * *